(12) United States Patent
Wojnowicz et al.

(10) Patent No.: US 10,489,589 B2
(45) Date of Patent: Nov. 26, 2019

(54) ANOMALY BASED MALWARE DETECTION

(71) Applicant: Cylance Inc., Irvine, CA (US)

(72) Inventors: Michael Wojnowicz, Irvine, CA (US); Matthew Wolff, Laguna Niguel, CA (US); Aditya Kapoor, Portland, OR (US)

(73) Assignee: Cylance Inc., Irvine, CA (US)

( * ) Notice: Subject to any disclaimer, the term of this patent is extended or adjusted under 35 U.S.C. 154(b) by 236 days.

(21) Appl. No.: 15/358,093

(22) Filed: Nov. 21, 2016

(65) Prior Publication Data
US 2018/0144131 A1 May 24, 2018

(51) Int. Cl.
G06F 21/56 (2013.01)

(52) U.S. Cl.
CPC .................. *G06F 21/563* (2013.01)

(58) Field of Classification Search
CPC ............................... G06F 21/563; G06N 3/08
USPC ........................................................... 726/23
See application file for complete search history.

(56) References Cited

U.S. PATENT DOCUMENTS

| | | | | |
|---|---|---|---|---|
| 4,959,870 A * | 9/1990 | Tachikawa | ............... | G06K 9/48 382/170 |
| 5,918,223 A * | 6/1999 | Blum | ................ | G06F 17/30017 |
| 6,226,640 B1 * | 5/2001 | Ostrovsky | ............ | G06K 9/6215 |
| 6,442,555 B1 * | 8/2002 | Shmueli | .............. | G06F 17/3071 |
| 7,873,634 B2 * | 1/2011 | Desbiens | .......... | G06F 17/30752 707/731 |
| 8,291,497 B1 * | 10/2012 | Griffin | .................. | G06F 21/564 709/224 |
| 8,401,982 B1 * | 3/2013 | Satish | .................. | G06N 99/005 706/12 |

(Continued)

FOREIGN PATENT DOCUMENTS

| | | | | |
|---|---|---|---|---|
| CN | 102142068 A | * | 8/2011 | |
| EP | 2182458 A1 | * | 5/2010 | ........... G06F 21/562 |

(Continued)

OTHER PUBLICATIONS

Kirchner, Peter D., Matthias Boehm, Berthold Reinwald, Daby Sow, Michael Schmidt, Deepak Turaga, and Alain Biem. "Large scale discriminative metric learning." In Parallel & Distributed Processing Symposium Workshops (IPDPSW), 2014 IEEE International, pp. 1656-1663. IEEE, 2014. (Year: 2014).*

(Continued)

*Primary Examiner* — Luu T Pham
*Assistant Examiner* — Walter J Malinowski
(74) *Attorney, Agent, or Firm* — Jones Day (57) ABSTRACT

In one respect, there is provided a system for training a neural network adapted for classifying one or more scripts. The system may include at least one processor and at least one memory. The memory may include program code that provides operations when executed by the at least one processor. The operations may include: reducing a dimensionality of a plurality of features representative of a file set; determining, based at least on a reduced dimensional representation of the file set, a distance between a file and the file set; and determining, based at least on the distance between the file and the file set, a classification for the file. Related methods and articles of manufacture, including computer program products, are also provided.

17 Claims, 5 Drawing Sheets

(56) References Cited

U.S. PATENT DOCUMENTS

| | | | | |
|---|---|---|---|---|
| 8,621,625 | B1* | 12/2013 | Bogorad | G06F 21/562 370/229 |
| 9,183,295 | B2* | 11/2015 | Vigouroux | G06F 16/60 |
| 9,185,119 | B1* | 11/2015 | Tamersoy | H04L 63/14 |
| 9,594,851 | B1* | 3/2017 | Chechik | G06F 16/90324 |
| 9,998,484 | B1* | 6/2018 | Buyukkayhan | H04L 63/1416 |
| 10,055,686 | B2* | 8/2018 | Huang | G06N 3/0454 |
| 2005/0105805 | A1* | 5/2005 | Nicponski | G06K 9/00248 382/216 |
| 2006/0020401 | A1* | 1/2006 | Davis | G01N 30/8603 702/30 |
| 2008/0228744 | A1* | 9/2008 | Desbiens | G06F 16/686 |
| 2009/0013405 | A1* | 1/2009 | Schipka | G06F 21/562 726/22 |
| 2009/0259608 | A1* | 10/2009 | Prakash | H04L 51/12 706/20 |
| 2010/0153356 | A1* | 6/2010 | Nakamura | G06Q 10/10 707/706 |
| 2010/0310157 | A1* | 12/2010 | Kim | G06K 9/00335 382/159 |
| 2011/0078159 | A1* | 3/2011 | Li | G06F 16/24534 707/749 |
| 2012/0167219 | A1* | 6/2012 | Zaitsev | G06F 21/56 726/24 |
| 2012/0269441 | A1* | 10/2012 | Marchesotti | G06N 99/005 382/195 |
| 2012/0284793 | A1* | 11/2012 | Steinbrecher | H04L 63/1425 726/23 |
| 2013/0190556 | A1* | 7/2013 | Wetmore | A61M 21/02 600/28 |
| 2013/0326625 | A1* | 12/2013 | Anderson | G06F 21/56 726/23 |
| 2013/0346456 | A1* | 12/2013 | Sparenberg | H04N 21/2183 707/825 |
| 2014/0037214 | A1* | 2/2014 | Deolalikar | G06K 9/00442 382/197 |
| 2014/0201208 | A1* | 7/2014 | Satish | G06F 21/564 707/737 |
| 2014/0278390 | A1* | 9/2014 | Kingsbury | G10L 15/1822 704/232 |
| 2014/0279762 | A1* | 9/2014 | Xaypanya | G06N 3/08 706/12 |
| 2015/0007319 | A1* | 1/2015 | Antonov | G06F 21/56 726/23 |
| 2015/0058988 | A1* | 2/2015 | Katz | H04L 63/145 726/23 |
| 2015/0096026 | A1* | 4/2015 | Kolacinski | G06F 21/55 726/23 |
| 2015/0096027 | A1* | 4/2015 | Romanenko | G06F 21/56 726/23 |
| 2015/0180890 | A1* | 6/2015 | Ronen | H04L 63/1416 726/23 |
| 2015/0193431 | A1* | 7/2015 | Stoytchev | G06F 19/18 704/9 |
| 2015/0213376 | A1* | 7/2015 | Ideses | G06N 99/005 706/12 |
| 2015/0248556 | A1* | 9/2015 | Sickendick | G06F 21/563 726/23 |
| 2015/0341376 | A1* | 11/2015 | Nandy | H04L 63/1408 726/23 |
| 2015/0369752 | A1* | 12/2015 | Honda | G01N 21/8851 356/237.2 |
| 2015/0379264 | A1* | 12/2015 | Alme | G06F 21/564 726/23 |
| 2016/0065597 | A1* | 3/2016 | Nguyen | H04L 63/1441 726/22 |
| 2017/0075996 | A1* | 3/2017 | Azimi | G06F 17/30864 |
| 2017/0193229 | A1* | 7/2017 | RoyChowdhury | G06F 21/564 |
| 2019/0138721 | A1* | 5/2019 | Wojnowicz | G06F 21/56 |

FOREIGN PATENT DOCUMENTS

| | | | | |
|---|---|---|---|---|
| WO | WO-2017185049 | A1 * | 10/2017 | G06F 21/56 |
| WO | WO-2017193036 | A1 * | 11/2017 | G06F 21/554 |

OTHER PUBLICATIONS

Radhakrishna, Vangipuram, Chintakindi Srinivas, and C. V. GuruRao. "A modified Gaussian similarity measure for clustering software components and documents." In Proceedings of the International Conference on Information Systems and Design of Communication, pp. 99-104. ACM, 2014. (Year: 2014).*

Dahl, George E., Jack W. Stokes, Li Deng, and Dong Yu. "Large-scale malware classification using random projections and neural networks." In Acoustics, Speech and Signal Processing (ICASSP), 2013 IEEE International Conference on, pp. 3422-3426. IEEE, 2013. (Year: 2013).*

Ponomarev, Stanislav, Jan Durand, Nathan Wallace, and Travis Atkison. "Evaluation of random projection for malware classification." In Software Security and Reliability-Companion (SERE-C), 2013 IEEE 7th International Conference on, pp. 68-73. IEEE, 2013. (Year: 2013).*

Asmitha, K. A., and P. Vinod. "A machine learning approach for linux malware detection." In Issues and Challenges in Intelligent Computing Techniques (ICICT), 2014 International Conference on, pp. 825-830. IEEE, 2014. (Year: 2014).*

Bazrafshan, Zahra, Hashem Hashemi, Seyed Mehdi Hazrati Fard, and Ali Hamzeh. "A survey on heuristic malware detection techniques." In Information and Knowledge Technology (IKT), 2013 5th Conference on, pp. 113-120. IEEE, 2013. (Year: 2013).*

Jiang, Qingshan, Nancheng Liu, and Wei Zhang. "A Feature Representation Method of Social Graph for Malware Detection." In Intelligent Systems (GCIS), 2013 Fourth Global Congress on, pp. 139-143. IEEE, 2013. (Year: 2013).*

Kleinberg, Jon M. "Two algorithms for nearest-neighbor search in high dimensions." In STOC, vol. 97, pp. 599-608. 1997. (Year: 1997).*

Ye, Yanfang, Dingding Wang, Tao Li, and Dongyi Ye. "IMDS: Intelligent malware detection system." In Proceedings of the 13th ACM SIGKDD international conference on Knowledge discovery and data mining, pp. 1043-1047. ACM, 2007. (Year: 2007).*

Nataraj, Lakshmanan, Sreejith Karthikeyan, Gregoire Jacob, and B. S. Manjunath. "Malware images: visualization and automatic classification." In Proceedings of the 8th international symposium on visualization for cyber security, p. 4. ACM, 2011. (Year: 2011).*

Watson, Michael R., Angelos K. Marnerides, Andreas Mauthe, and David Hutchison. "Malware detection in cloud computing infrastructures." IEEE Transactions on Dependable and Secure Computing 13, No. 2 (2015): 192-205. (Year: 2015).*

* cited by examiner

ANOMALY BASED MALWARE DETECTION

TECHNICAL FIELD

The subject matter described herein relates generally to malware detection and more specifically to anomaly based malware detection.

RELATED ART

Malware classification typically relies on a collection of pre-identified signatures, which may refer to features such as snippets of program code and/or the like, that are known to be associated with malware files. However, signature-based malware detection may be easily evaded by modifying a malware file to deviate from these pre-identified signatures. As such, a signature-based malware classifier may be unable to effectively detect new (e.g., zero-day), uncommon, and/or mutated malware files that do not exhibit any pre-identified signatures.

SUMMARY

Systems, methods, and articles of manufacture, including computer program products, are provided for anomaly based malware detection. In some example embodiments, there is provided a system that includes at least one processor and at least one memory. The at least one memory may include program code that provides operations when executed by the at least one processor. The operations may include: reducing a dimensionality of a plurality of features representative of a file set; determining, based at least on a reduced dimension representation of the file set, a distance between a file and the file set; and determining, based at least on the distance between the file and the file set, a classification for the file.

In some variations, one or more features disclosed herein including the following features can optionally be included in any feasible combination. The reducing of the dimensionality of the plurality of features may include generating a random projection of the plurality of features, wherein the random projection of the plurality of features corresponds to the reduced dimension representation of the file set. The reducing of the dimensionality of the plurality of features may include applying principal component analysis, randomized principal component analysis, and/or feature hashing to at least map the plurality of features to a lower-dimensional space. The reducing of the dimensionality of the plurality of features may include merging, into a single dimension, two or more of the plurality of features.

In some variations, files in the reduced dimension representation of the file set may conform to a distribution. For instance, the distribution may be a Gaussian distribution and/or a near Gaussian distribution. The distance between the file and the file set may correspond to an amount of deviation between features of the file and the plurality of features representative of the file set.

In some variations, the file set may include at least one file that is known to be a benign file. As such, the file may be determined to be a malware file, when the distance between the file and the file set exceeds a threshold value. Alternately, the file may be determined to be a benign file, when the distance between the file and the file set does not exceed the threshold value.

In some variations, the file set may include at least one file that is known to be a malware file and/or a specific type or family of malware file. As such, the file may be determined to be a malware file and/or a specific type or family of malware file, when the distance between the file and the file set does not exceed a threshold value. Alternately, the file may be determined to be a benign file, when the distance between the file and the file set exceeds the threshold value.

In some variations, the determining of the distance between the file and the file set may include determining a Mahalanobis distance between the file and the file set, wherein the Mahalanobis distance indicates a percentage of files in the file set that are different from the file.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used whenever possible to refer to same or similar items in the drawings.

DETAILED DESCRIPTION

Signature-based malware detection, which relies on pre-identified signatures, may fail to detect new, uncommon, and/or mutated malware files that do not exhibit any pre-identified signatures. By contrast, an anomaly-based malware classifier may detect malware files based on comparisons to files having known classifications including, for examples files that are known to be benign (e.g., non-malware), malware, and/or specific types or families of malware. For instance, an anomaly-based malware classifier may classify a file as a malware file if the file is sufficiently different from files that are known to be benign. In doing so, anomaly-based malware classifiers may be able to detect new, uncommon, and/or mutated malware files that do not exhibit any pre-identified signatures. However, anomaly-based malware detection may require a baseline setting forth the features indicative of a benign file, a malware file, and/or a specific type of malware file (e.g., adware, ransomware, bots, bugs, rootkits, spyware, Trojan horses, viruses, worms, and/or the like). This baseline may be established by identifying and correlating features from across a plurality of files having known classifications. But files may oftentimes be high-dimensional datasets that include a vast number of features and thus tend to defy conventional efforts to identify and correlate features from therein.

In some example embodiments, a malware detection system may be configured to classify a file based on the file's proximity to a file set having files with known classifications. For example, the file set may include benign files and/or malware files. The malware detection system may determine the distance (e.g., Mahalanobis distance and/or the like) between the file and the file set. The distance between the file and the file set may correspond to an amount of deviation between the features of the file and the features of the files having known classifications (e.g., benign, malware, specific malware type or family). Accordingly, the malware detection system may classify the file based on the distance between the file and the file set. For instance, the malware detection system may classify the file as a malware file when the distance between the file and a file set of benign files exceeds a threshold value. Alternately, the malware detection system may classify the file as a malware file and/or a specific type or family of malware file when the distance between the file and a file set of malware files and/or specific type or family of malware files do not exceed a threshold value.

In some example embodiments, the high dimensionality of a file set may preclude a direct determination of a probability distribution for the file set, which may describe the likelihood of occurrence (e.g., in the file set) of files having different features. Thus, the malware detection system may be configured to reduce the dimensionality of the file set in order to be able to determine a probability distribution for the file set. For instance, the malware detection system may apply one or more dimensionality reduction techniques including, for example, random projection, principal component analysis, feature hashing, and/or the like. By applying certain dimensionality reduction techniques to an appropriate representation of the file set, the malware detection system may generate a low-dimensional dataset that exhibits a Gaussian or near Gaussian distribution. In doing so, the malware detection system may be able to determine an amount of deviation (e.g., the Mahalanobis distance) between the file and a Gaussian and/or near Gaussian approximation of the file set as a whole.

In some example embodiments, the malware detection system may classify a file based on the file's proximity to a file set having files with known classifications as well as one or more additional features associated with the file. Other features that may be used in classifying the file may include, for example, a size of the file, one or more strings (e.g., of characters and/or binary digits) included in the file, metadata associated with the file, a type of the file, and/or the like. For example, the malware detection system may classify a file based on an icon associated with the file and discrepancies between a type of the file (e.g., a portable document file (PDF)) and a file type indicated by the icon associated with the file (e.g., a Word document icon), as well as other features related to the file.

Figure 1:
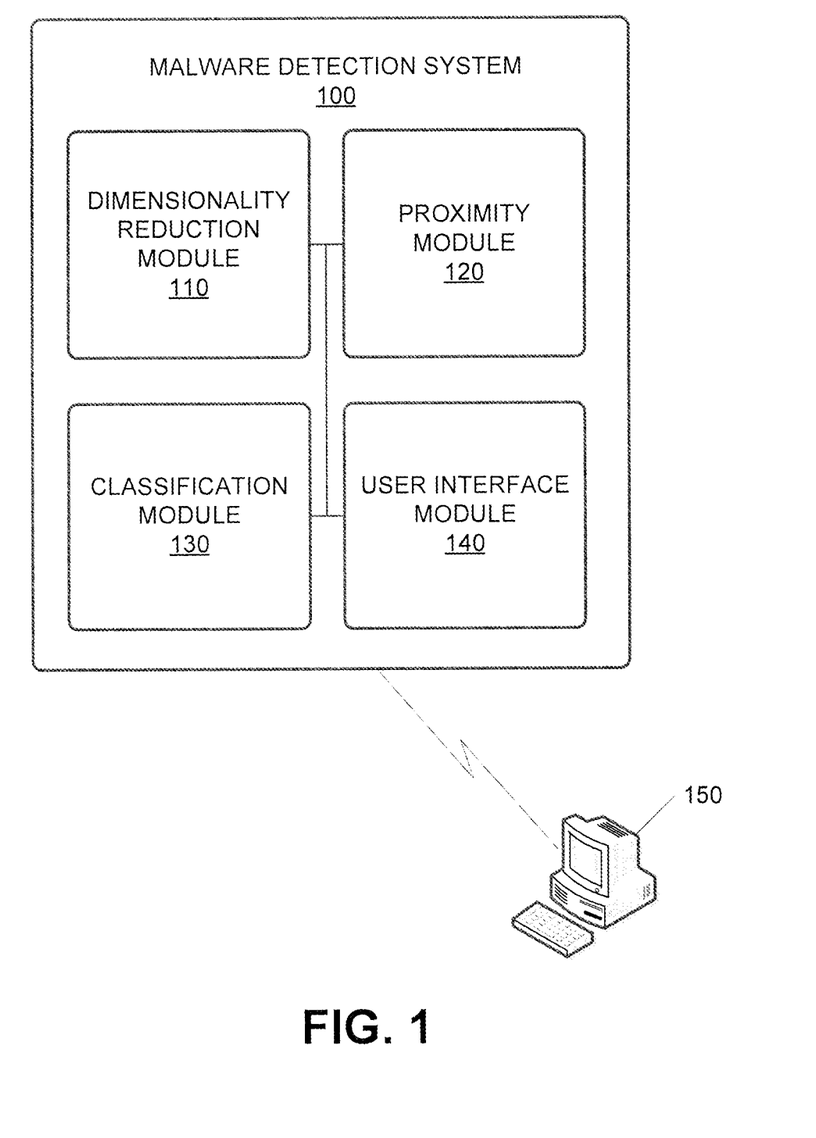
FIG. 1 depicts a block diagram illustrating a malware detection system, in accordance with some example embodiments.

FIG. 1 depicts a block diagram illustrating a malware detection system 100, in accordance with some example embodiments. Referring to FIG. 1, the malware detection system 100 may include a plurality of modules including, for example, a dimensionality reduction module 110, a proximity module 120, a classification module 130, and a user interface module 140. It should be appreciated that the malware detection system 100 may include different and/or additional modules than shown without departing from the scope of the present disclosure.

As shown in FIG. 1, the malware detection system 100 can communicate with a client device 150. The malware detection system 100 may be configured to provide one or more functionalities including, for example, anomaly-based malware detection. For instance, the malware detection system 100 may determine whether files present on and/or encountered at the client device 150 may be malware files. According to some example embodiments, the functionalities of the malware detection system 100 may be accessed over a remote (e.g., cloud) platform and/or an endpoint agent (e.g., at the client device 150). For instance, the malware detection system 100 may communicate with the client device 150 via a wired and/or wireless network including, for example, a local area network (LAN), a wide area network (WAN), and the Internet. Alternately and/or additionally, the malware detection system 100 may be deployed at the client device 150 as computer software and/or dedicated circuitry (e.g., application specific integrated circuits (ASICs)).

In some example embodiments, the dimensionality reduction module 110 may be configured to reduce the dimensionality of a file set, which includes one or more files having known classifications (e.g., benign, malware, specific malware type or family). For example, the dimensionality reduction module 110 may reduce the dimensionality of a file set by at least generating a random projection of the file set. Similarly, the dimensionality reduction module 110 may also reduce the dimensionality of an unclassified file by at least generating a random projection of the unclassified file. Reducing the dimensionality of the unclassified file may enable a determination of a proximity between the unclassified file and the file set having files with known classifications. It should be appreciated that other dimensionality reduction techniques (e.g., principal component analysis (PCA), randomized principal component analysis, feature hashing) may be applied instead of and/or in addition to random projection without departing from the scope of the present disclosure.

To further illustrate, suppose that the file set is a d-dimensional dataset having an N number of files (e.g., that are known to be benign, malware, and/or a specific malware type or family) and a d number of features. As such, the file set may be a d-dimensional dataset that can be expressed as a d×N matrix $X_{d \times N}$. The dimensionality reduction module 110 may generate a random projection of the file set by at least applying a random k×d matrix $R_{k \times d}$ to reduce the file set from a d-dimensional dataset to a lower k-dimensional dataset. That is, applying the random k×d matrix $R_{k \times d}$ may merge together at least some of the d number of features. For example, applying the random k×d matrix $R_{k \times d}$ may merge, into a single column, two more columns in the d×N matrix $X_{d \times N}$ that correspond to similar and/or correlated features. In doing so, two or more dimensions from the d-dimensional dataset may be merged or reduced into a single dimension in the k-dimensional dataset.

In some example embodiments, the lower k-dimensional dataset may have a fewer k number of features than the original d-dimensional dataset. This lower k-dimensional dataset may be expressed as a k×N matrix $X_{k \times N}^{RP}$, where k<d. Otherwise stated, reducing the dimensionality of the file set may include generating a projection of data onto a lower k-dimensional subspace that may be expressed by the following equation (1):

$$X_{k \times N}^{RP} = R_{k \times d} X_{d \times N} \quad (1)$$

Reducing the dimensionality of the file set may generate a lower k-dimensional dataset that may exhibit a Gaussian and/or near Gaussian distribution. For example, files in the k-dimensional dataset may conform to a scale-mixture of Gaussian distributions, discrete approximations of Gaussian distributions, and/or the like. A Gaussian and/or near Gaussian distribution may provide the probability density for the file set, thereby describing the likelihood of occurrence (e.g., in the file set) for files having different features. Thus, a Gaussian distribution may describe the relationships amongst the individual files in the file set based on an amount of deviation between the features found in each file relative to the expected features (e.g., mean) of the file set as a whole. However, it should be appreciated that reducing the dimensionality of the file set may generate a lower k-dimensional dataset that exhibit a different non-Gaussian distribution and/or a distribution having multiple Gaussian components with different mean values.

The probability density associated with a univariate or one-dimensional Gaussian and/or near Gaussian distribution is provided as an example. In some example embodiments, a univariate Gaussian distribution may be given by the following equation (2):

$$f(x \mid \mu, \sigma^2) = \frac{1}{\sqrt{2\sigma^2 \pi}} e^{\frac{(x-\mu)^2}{2\sigma^2}} \quad (2)$$

wherein $\mu$ may be the expected features (e.g., mean) for files in the file set as a whole, $\sigma$ may be the standard deviation, and $\sigma^2$ may be the variance corresponding to an amount of deviation from the expected features.

Figure 2A:
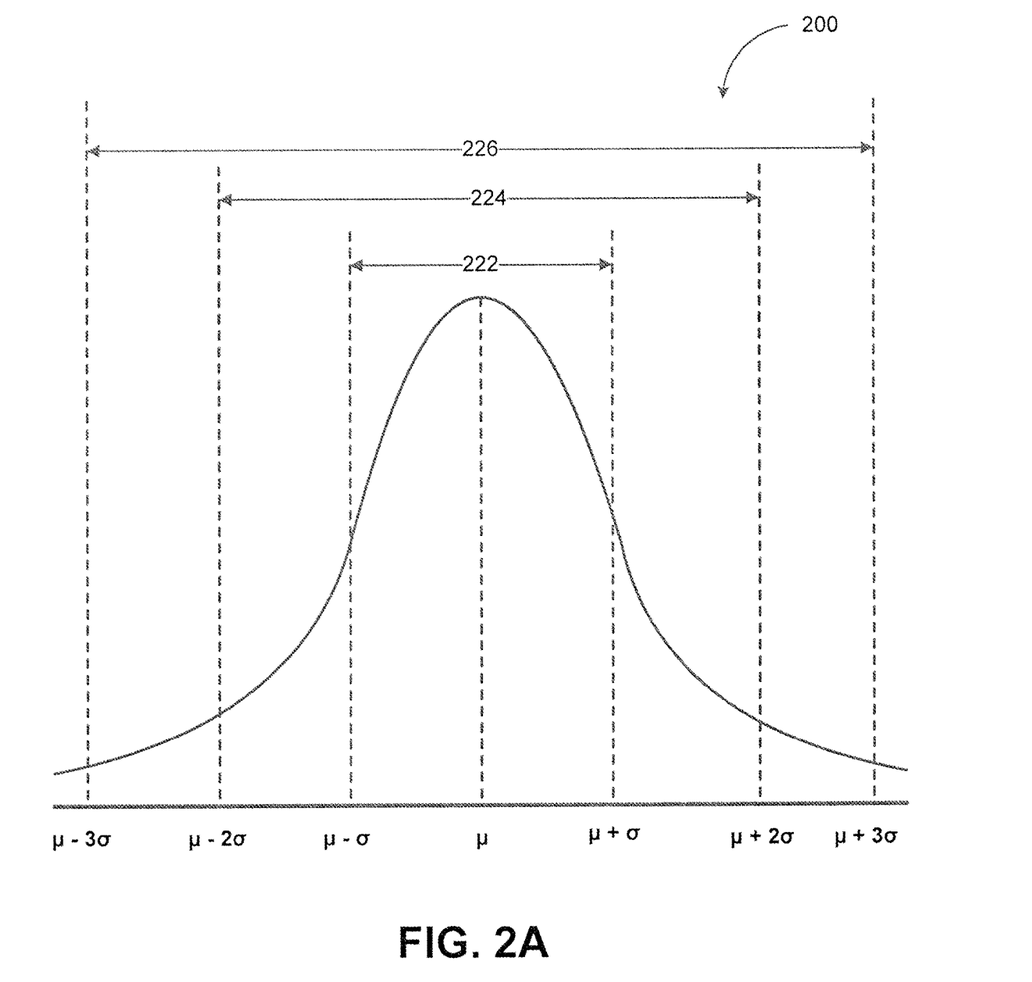
FIG. 2A depicts a graph illustrating a univariate Gaussian distribution, in accordance with some example embodiments.

FIG. 2A depicts a graph illustrating a univariate Gaussian distribution 200, in accordance with some example embodiments. Referring to FIGS. 1-2, when a file set conforms to a univariate Gaussian and/or near Gaussian distribution, the probability density of the file set may be approximated by the curve 210. Thus, a first proportion 222 of the file set, which may include approximately 68% of the files in the file set, may have features that are only one standard deviation $\sigma$ away from the expected feature $\mu$ (e.g., mean) of features for the files in the file set as a whole. Meanwhile, a second proportion 224 of the file set, which may include approximately 95% of the files in the file set, may have features that are within two standard deviations $2\sigma$ away from the expected feature $\mu$ (e.g., mean) of features for the files in the file set as a whole. A third proportion 226 of the file set, which may include approximately 99.7% of the files in the file set, may have features that are within three standard deviations $3\sigma$ away from the expected feature $\mu$ (e.g., mean) of features for the files in the file set as a whole. When applied to higher dimensional Gaussian and/or near Gaussian distributions, reducing the dimensionality of the file set may generate a lower k-dimensional dataset in which a large proportion (e.g., 99.7%) of the files are relatively similar and have features that deviate only slightly from the expected features for the file set as a whole. As such, reducing the dimensionality of the file set may uncover relationships (e.g., similarities) between an unclassified file and a file set that includes files having known classifications.

Figure 2B:
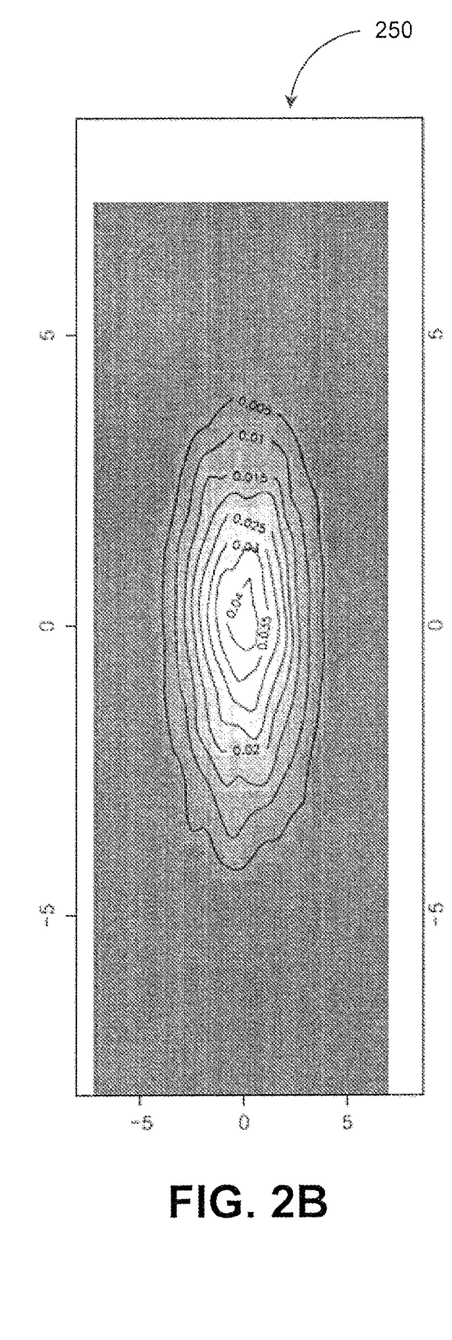
FIG. 2B depicts a heat map illustrating a two-dimensional Gaussian distribution, in accordance with some example embodiments.

FIG. 2B depicts a heat map illustrating a two-dimensional Gaussian distribution 250, in accordance with some example embodiments. As shown in FIG. 2B, when a file set conforms to a two-dimensional Gaussian distribution, the probability density of the file set may be approximated by the heat map shown in FIG. 2B. The x and y axes of the heat map represent values of random variables along different dimensions. The closer the color of the heat map is to white (e.g., toward the center of the heat map), the higher the concentration of the random variable at that point along the x and y axes.

Figure 2C:
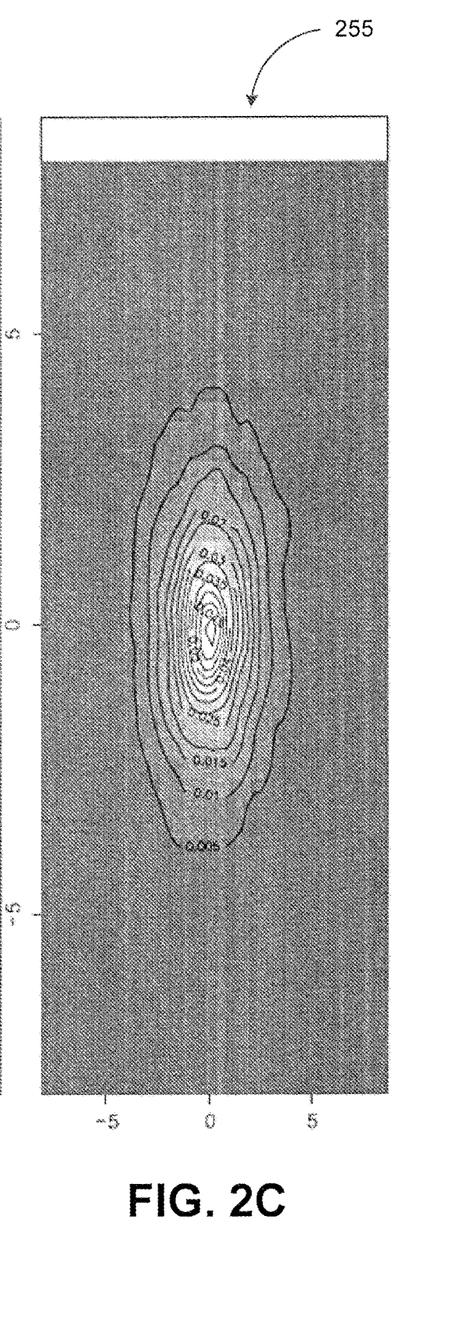
FIG. 2C depicts a heat map illustrating a two-dimensional scale-mixture of Gaussian distribution, in accordance with some example embodiments.

FIG. 2C depicts a heat map illustrating a two-dimensional scale-mixture of Gaussians distribution, in accordance with some example embodiments. When a file set conforms to a two-dimensional scale-mixture of Gaussian distribution, the probability density of the file set may be approximated by the heat map shown in FIG. 2C. The x and y axes of the heat map represent values of random variables along different dimensions. The closer the color of the heat map is to white (e.g., toward the center of the heat map), the higher the concentration of the random variable at that point along the x and y axes.

Referring to FIGS. 2B-C, the two-dimensional Gaussian distribution 250 and the two-dimensional scale-mixture of Gaussians distribution 255 may both be symmetric distributions and have the same mean and covariance matrix. However, the two-dimensional Gaussian distribution 250 and the two-dimensional scale-mixture of Gaussian distribution 255 may have different concentrations around the mean of the respective distributions and/or different tail behavior (e.g., behavior at portions of the respective distributions that lie far away from the mean).

In some example embodiments, the proximity module 120 may be configured to determine a proximity between an unclassified file and the file set having one or more files with known classifications. For example, the proximity module 120 may be configured to determine a distance between a random projection of the unclassified file and a random projection of the file set (e.g., generated by the dimensionality reduction module 110). That is, the proximity module 120 may determine a distance (e.g., Mahalanobis distance) between lower k-dimensional representations of the unclassified file and of the file set. As noted above, the distance between the unclassified file and the file set may correspond to an amount of deviation between the features of the unclassified file and the features of the files in the file set. It should be appreciated that the proximity module 120 may apply a different technique to determine the proximity between the unclassified file and a file set (e.g., with one or more benign files, malware files, and/or specific types or families of malware files) without departing from the scope of the present disclosure.

In some example embodiments, the random projection of a file set may be a lower k-dimensional dataset that conforms to a Gaussian or a near Gaussian distribution (e.g., a scale-mixture of Gaussians). However, the lower k-dimensional dataset can form more than one cluster, such as when the original file set includes multiple clusters. Here, the proximity module 120 may be configured to determine a generalized distance (e.g., Mahalanobis distance) between the lower k-dimensional representation of the unclassified file and all of the clusters formed by the lower k-dimensional representation of the file set. According to some example embodiments, an algorithmic technique (e.g., hierarchical Dirichlet process mixture model (HDP-MM)) may be applied to detect the presence of multiple clusters in the random projection of the file set (e.g., the lower k-dimensional representation of the file set). The distance between a random projection of the unclassified file and a random projection of the file set may be generalized to account for the multiple clusters present in the random projection of the file set, when application of the algorithmic technique detects the presence of multiple clusters in the random projection of the file set. It should also be appreciated that the proximity module 120 may be configured to distance between the lower k-dimensional representation of the unclassified file and the lower k-dimensional representation of the file set, even when the lower k-dimensional representation of the file set does not conform to a Gaussian or near Gaussian distribution (e.g., a scale-mixture of Gaussians, discrete approximation of Gaussians, and/or the like).

Figure 3:
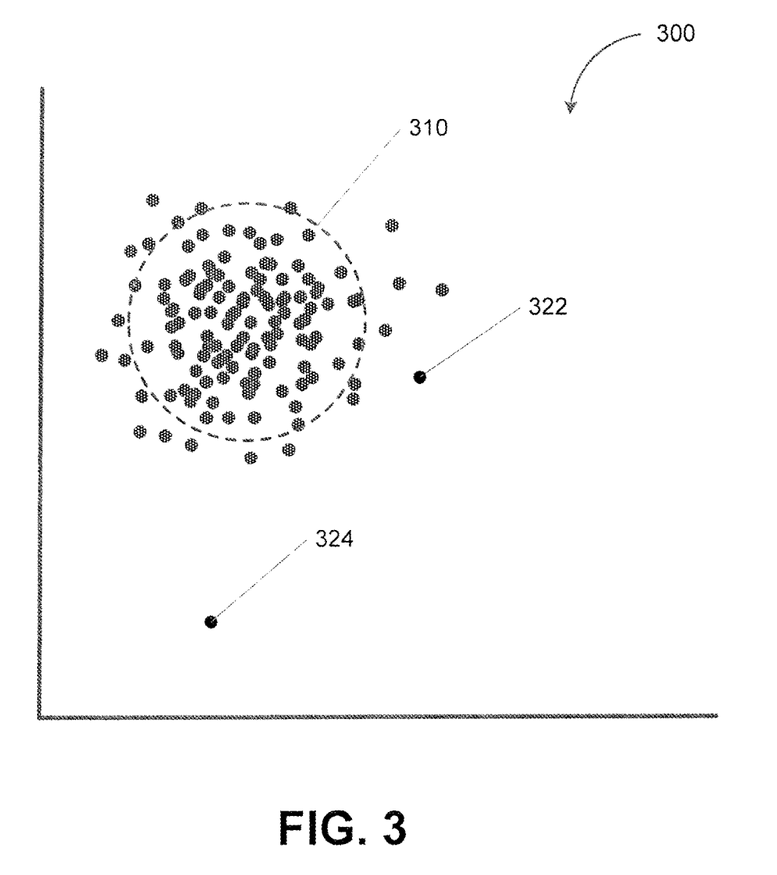
FIG. 3 depicts a graph illustrating a distance between one or more file and a file set, in accordance with some example embodiments.

FIG. 3 depicts a graph 300 illustrating a distance between one or more files and a file set, in accordance with some example embodiments. The dimensionality reduction module 110 may generate a lower k-dimensional representation of a file set having one or more files with known classifications (e.g., benign, malware, and/or specific type or family of malware). That is, the one or more files in the file set may be represented by a k number of features. The lower k-dimensional representation of the file set may conform to a Gaussian and/or near Gaussian distribution. Thus, as shown in FIG. 3, the one or more files in the file set may form one or more clusters including, for example, a cluster 310. Individual files in the file set having features that deviate less from the expected features of the file set as a whole may be clustered closer together toward a center of the cluster 310.

According to some example embodiments, the proximity module 120 may determine a Mahalanobis distance between an unclassified file and the file set. The Mahalanobis distance corresponds to a deviation between the features of the unclassified file and the expected features of the file set as a whole. To further illustrate, the unclassified file may be represented by a k number of features and may thus be denoted as $\vec{x}=(x_1, x_2, x_3, \ldots, x_k)^T$. Meanwhile, the expected features of the file set as a whole may be denoted as $\vec{\mu}=(\mu_1, \mu_2, \mu_3, \ldots, \mu_k)$. The Mahalanobis distance $D_M$ between the unclassified file $\vec{x}$ and the expected features $\vec{\mu}$ of the file set as a whole may be expressed by the following equation (3):

$$D_M(\vec{x}) = \sqrt{(\vec{x}-\vec{\mu})^T S^{-1}(\vec{x}-\vec{\mu})}$$

wherein S denotes a covariance matrix describing the expected covariation between features in the file set. The covariance between two features corresponds to a measure of how the two features may change together. Thus, the covariance matrix describes how a set of features are expected to change in tandem. For instance, two features may have a positive covariance when both features increase or decrease in tandem. By contrast, two features may have a negative covariance when one feature is increasing while the other is decreasing. The covariance matrix may range from a highly structured matrix (e.g., an identity matrix or another type of diagonal matrix) to completely unstructured matrix where the elements of the matrix do not adhere to a discernable pattern.

As shown in FIG. 3, the proximity module 120 may determine the Mahalanobis distance between a first file 322 and the cluster 310 formed by the file set. Similarly, the proximity module 120 may further determine the Mahalanobis distance between a second file 324 and the cluster 310. The Mahalanobis distance may correspond to an amount of deviation between the features of a file relative to the expected features of a file set as a whole. That is, the Mahalanobis distance may indicate that a file is different from a certain percentage of the files in a file set. For instance, the Mahalanobis distance between the first file 322 and the cluster 310 may be an anomaly score indicating that the first file 322 is more anomalous than an m percentage of files in the file set. Meanwhile, the Mahalanobis distance between the second file 324 and the cluster 310 may an anomaly score indicating that the second file 324 is more anomalous than an n percentage of files in the file set.

In some implementations of the current subject matter, the classification module 130 may be configured to classify a file, which may be an unclassified file that is encountered at and/or present on the client device 150. The classification module 130 may classify the file based on a distance between the file and a file set having one or more files with known classifications (e.g., as determined by the proximity module 120). That is, the file may be classified based on an amount of deviation between the features of the file and the features of the files in the file set. As such, the classification module 140 may classify the file based on whether a distance between the file and the file set exceeds a threshold value. For example, the classification module 140 may classify the file as a benign file if the distance between the file and a file set that includes one or more benign files does not exceed a threshold value. Alternately and/or additionally, the classification module 140 may classify the file as a malware file and/or a specific type or family of malware file if the distance between the file and a file set that includes one or more malware files and/or one more specific types or families of malware files does not exceed a threshold value.

In some example embodiments, the classification module 140 may classify a file based on the Mahalanobis distance between the file and a file set having one or more files that are known to be benign. The Mahalanobis distance between the file and the file set may indicate that the file is more anomalous than a certain percentage of the files in the file set. Thus, the classification module 150 may classify the file as a malware file when the file is more anomalous than a threshold percentage of the files in the file set. Referring again to FIG. 3, the proximity module 120 may determine that the first file 322 is more anomalous than an m percentage of files in the file set while the second file 324 is more anomalous than an n percentage of files in the file set. The classification module 130 may classify the first file 322 as a benign file if m does not exceed the threshold percentage. By contrast, the classification module 130 may classify the second file 324 as a malware file if n does exceed the threshold percentage.

In some example embodiments, the user interface module 140 may be configured to generate one or more user interfaces that enable interactions between a user of the client device 150 and the malware detection system 100. For example, the user interface module 140 may generate a graphic user interface (GUI) that enables the user of the client device 150 to input and/or indicate a file that requires classification. Alternately and/or additionally, the user interface module 140 may generate a graphic user interface that displays a result of the anomaly-based classification performed by the malware detection system 100. For instance, the user interface module 140 may generate a graphic user interface displaying the anomaly score of a file and/or a classification of the file (e.g., as a benign file, malware file, or specific type or family of malware file).

Figure 4:
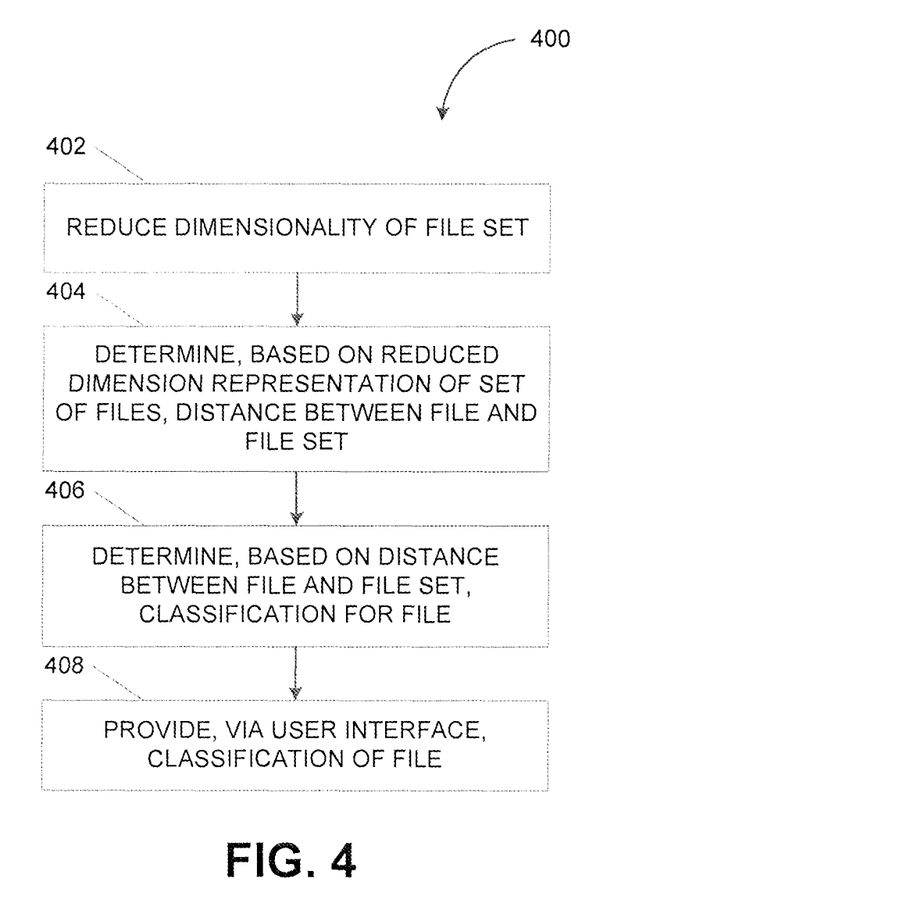
FIG. 4 depicts a flowchart illustrating a process for anomaly based malware detection, in accordance with some example embodiments.

FIG. 4 depicts a flowchart illustrating a process 400 for anomaly based malware detection, in accordance with some example embodiments. Referring to FIG. 1-4, the process 400 may be performed by the malware detection system 100.

The malware detection system 100 may reduce a dimensionality of a file set having one or more files (402). For instance, the malware detection system 100 (e.g., the dimensionality reduction module 110) may reduce the dimensionality of a file set having files that are known to be benign by at least applying one or more dimensionality reduction techniques. In some example embodiments, the malware detection system 100 may generate a random projection of the file set by at least applying a random k×d matrix $R_{k \times d}$ to the file set. In doing so, the malware detection system 100 may reduce the file set from a d-dimensional dataset to a lower k-dimensional dataset. That is, reducing the dimensionality of the file set may merge together at least some of a d number of features used to represent the file set. This lower k-dimensional dataset may exhibit a Gaussian and/or near Gaussian distribution (e.g., a scale-mixture of Gaussians), which may describe the relationships amongst the individual files in the file set based on an amount of deviation between the features found in each file relative to the expected features (e.g., mean) of the file set as a whole. Referring to FIG. 3, the lower k-dimensional dataset may form a cluster, such as the cluster 310, that corresponds to a probability distribution for the file set.

The malware detection system 100 may determine, based on a reduced dimension representation of the file set, a distance between a file and the file set (404). For instance, the distance between a file and a file set may correspond to an amount of deviation between features in the file and the features of the files in the file set. In some example embodiments, the malware detection system 100 (e.g., the proximity module 120) may determine a Mahalanobis distance between the file and the file set. The Mahalanobis distance between the file and the file set may be an anomaly score indicating that the file is more anomalous than a certain percentage of the benign files in the file set. Alternately and/or additionally, the Mahalanobis distance between the file and the file set may be an anomaly score indicating that the file is as anomalous as a certain percentage of malware files in the file set.

Referring again to FIG. 3, the malware detection system (e.g., the proximity module 120) may determine that the Mahalanobis distance between the first file 322 and the cluster 310 as well as the Mahalanobis distance between the second file 324 and the cluster 310. The Mahalanobis distance between the first file 322 and the cluster 310 may indicate that the first file 322 is more anomalous than an m percentage of files in the file set. Meanwhile, the Mahalanobis distance between the second file 324 and the cluster 310 may indicate that the second file 324 is more anomalous than an n percentage of files in the file set.

The malware detection system 100 may determine, based at least on the distance between the file and the file set, a classification for the file (406). In some example embodiments, the malware detection system 100 (e.g., the classification module 130) may determine that a file is a malware file when the distance between the file and the file set exceeds a threshold value. For example, the malware detection system (e.g., the classification module 130) may classify the file as a malware file when the file is more anomalous than a threshold percentage of the benign files in the file set and/or when the file is as anomalous as a threshold percentage of the malware files in the file set. Thus, in the example with respect to FIG. 3, the malware detection system 100 (e.g., the classification module 130) may classify the first file 322 as a benign file if m does not exceed the threshold percentage. By contrast, the classification module 130 may classify the second file 324 as a malware file if n does exceed the threshold percentage.

The malware detection system 100 may provide, via a user interface, the classification of the file (408). For example, the malware detection system 100 (e.g., the user interface module 140) may generate a user interface (e.g., a graphic user interface) that displays (e.g., at the client device 150) the classification of the file indicating whether the file is a malware file or a benign file. Alternately and/or additionally, the user interface may display the anomaly score of the file, which indicates that the file is more anomalous than a certain percentage of the files that are known to be benign.

Implementations of the present disclosure can include, but are not limited to, methods consistent with the descriptions provided above as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a computer-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital MRI image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claim.

What is claimed is:

1. A system, comprising:
   at least one processor; and
   at least one memory including program code which when executed by the at least one processor provides operations comprising:
   reducing a dimensionality of a plurality of features representative of files within a file set having a plurality of clusters, the files representing benign files such that the files in the reduced dimension representation of the file set conform to a mixture of Gaussian distributions, the reducing being performed by generating a random projection of the plurality of features, wherein the files in the file set are not distributed in a Gaussian manner prior to the reducing;
   reducing a dimensionality of a plurality of features of a file to be classified;
   determining, based at least on a reduced dimension representation of the file set and the reduced dimension representation of the file, a Mahalanobis distance between the file and the file set, the distance characterizing a deviation between the file and the file set;
   determining, based at least on the distance between the file and the file set being greater than a threshold value indicating that the file is anomalous, a classification for the file, the classification being used to determine whether to access and/or execute the file; and
   preventing the file from being accessed or executed when the classification indicates that the file is malware.

2. The system of claim 1, wherein the reducing of the dimensionality of the plurality of features comprises:
   generating a random projection of the plurality of features, wherein the random projection of the plurality of features corresponds to the reduced dimension representation of the file set.

3. The system of claim 1, wherein the reducing of the dimensionality of the plurality of features comprises:

applying principal component analysis, randomized principal component analysis, and/or feature hashing to at least map the plurality of features to a lower-dimensional space.

4. The system of claim 1, wherein the reducing of the dimensionality of the plurality of features comprises:
merging, into a single dimension, two or more of the plurality of features.

5. The system of claim 1, wherein the distance between the file and the file set corresponds to an amount of deviation between features of the file and the plurality of features representative of the file set.

6. The system of claim 5, wherein the file set includes at least one file that is known to be a malware file and/or a specific type or family of malware file.

7. The system of claim 6, wherein the file is determined to be a malware file and/or a specific type or family of malware file, when the distance between the file and the file set does not exceed a threshold value, and wherein the file is determined to be a benign file, when the distance between the file and the file set exceeds the threshold value.

8. The system of claim 1, wherein the file is determined to be a malware file, when the distance between the file and the file set exceeds the threshold value, and wherein the file is determined to be a benign file, when the distance between the file and the file set does not exceed the threshold value.

9. A system as in claim 1, wherein the operations further comprise: applying a hierarchical Dirichlet process mixture model to detect a presence of multiple clusters in the random projection of the file set.

10. A method, comprising:
reducing a dimensionality of a plurality of features representative of files within a file set having a plurality of clusters, the files representing benign files such that the files in the reduced dimension representation of the file set conform to a mixture of Gaussian distributions, the reducing being performed by generating a random projection of the plurality of features, wherein the files in the file set are not distributed in a Gaussian manner prior to the reducing;
reducing a dimensionality of a plurality of features of a file to be classified;
determining, based at least on a reduced dimension representation of the file set and the reduced dimension representation of the file, a Mahalanobis distance between a file and the file set;
determining, based at least on the distance between the file and the file set being greater than a threshold value indicating that the file is anomalous, a classification for the file, the classification being used to determine whether to access and/or execute the file; and
preventing the file from being accessed or executed when the classification indicates that the file is malware.

11. The method of claim 10, wherein the reducing of the dimensionality of the plurality of features comprises:
generating a random projection of the plurality of features, wherein the random projection of the plurality of features corresponds to the reduced dimension representation of the file set.

12. The method of claim 10, wherein the reducing of the dimensionality of the plurality of features comprises:
merging, into a single dimension, two or more of the plurality of features.

13. The method of claim 10, wherein the distance between the file and the file set corresponds to an amount of deviation between features of the file and the plurality of features representative of the file set.

14. The method of claim 13, wherein the file set includes at least one file that is known to be a malware file and/or a specific type or family of malware file.

15. The method of claim 14, wherein the file is determined to be a malware file and/or a specific type or family of malware file, when the distance between the file and the file set does not exceed a threshold value, and wherein the file is determined to be a benign file, when the distance between the file and the file set exceeds the threshold value.

16. The method of claim 10, wherein the file is determined to be a malware file, when the distance between the file and the file set exceeds the threshold value, and wherein the file is determined to be a benign file, when the distance between the file and the file set does not exceed the threshold value.

17. A non-transitory computer-readable storage medium including program code which when executed by at least one processor causes operations comprising:
reducing a dimensionality of a plurality of features representative of files within a file set having a plurality of clusters, the files representing benign files such that the files in the reduced dimension representation of the file set conform to a mixture of Gaussian distributions, the reducing being performed by generating a random projection of the plurality of features, wherein the files in the file set are not distributed in a Gaussian manner prior to the reducing;
reducing a dimensionality of a plurality of features of a file to be classified;
determining, based at least on a reduced dimension representation of the file set and the reduced dimension representation of the file, a Mahalanobis distance between a file and the file set;
determining, based at least on the distance between the file and the file set, a classification for the file, the classification being used to determine whether to access and/or execute the file; and
preventing the file from being accessed or executed when the classification indicates that the file is malware;
wherein the file is determined to be a malware file, when the distance between the file and the file set exceeds a threshold value, and wherein the file is determined to be a benign file, when the distance between the file and the file set does not exceed the threshold value.

* * * * *